US012638692B2

(12) United States Patent
Sharma et al.

(10) Patent No.: US 12,638,692 B2
(45) Date of Patent: May 26, 2026

(54) CAMPFIRE DISPLAY WITH POLARIZATION OPTICS

(71) Applicant: GM Global Technology Operations LLC, Detroit, MI (US)

(72) Inventors: Manoj Kumar Sharma, Troy, MI (US); Joseph F. Szczerba, Grand Blanc, MI (US); Tzvi Philipp, Bet Shemesh (IL); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 414 days.

(21) Appl. No.: 18/363,226

(22) Filed: Aug. 1, 2023

(65) Prior Publication Data

US 2025/0044610 A1 Feb. 6, 2025

(51) Int. Cl.
| | |
|---|---|
| *G02B 30/56* | (2020.01) |
| *G02B 5/30* | (2006.01) |
| *G02B 27/14* | (2006.01) |
| *G03B 21/14* | (2006.01) |

(52) U.S. Cl.
CPC ........... *G02B 30/56* (2020.01); *G02B 5/3025* (2013.01); *G02B 27/14* (2013.01)

(58) Field of Classification Search
CPC ...... G02B 30/56; G02B 5/3025; G02B 27/14; G03B 21/14
See application file for complete search history.

(56) References Cited

U.S. PATENT DOCUMENTS

| | | | |
|---|---|---|---|
| 6,481,851 | B1 | 11/2002 | McNelley et al. |
| 2009/0009862 | A1 | 1/2009 | Hong |
| 2011/0002038 | A1 | 1/2011 | Wang |
| 2018/0188550 | A1* | 7/2018 | Frayne .................. G02B 30/56 |

FOREIGN PATENT DOCUMENTS

WO 2017196399 A1 11/2017

OTHER PUBLICATIONS

Chang, K., et al. U.S. Appl. No. 17/842,253, filed Jun. 16, 2022.
(Continued)

*Primary Examiner* — Ryan D Howard
(74) *Attorney, Agent, or Firm* — Vivacqua Crane, PLLC

(57) ABSTRACT

A system for generating an image display for passengers within a vehicle includes a controller, an image chamber including a first display adapted to project a first image, a first reflector adapted to receive the first image from the first display and reflect the first image to the first passenger, a second display adapted to project a second image, and a second reflector adapted to receive the second image from the second display and reflect the second image to the second passenger, a transparent touch screen display positioned between the first and second reflectors and the passengers and adapted to display information to the passengers within an image plane positioned in front of the first and second images, and a linear polarizer positioned between the transparent display and the first and second reflectors and adapted to filter light traveling from the transparent display toward the first and second reflectors.

20 Claims, 5 Drawing Sheets

(56)          References Cited

OTHER PUBLICATIONS

Seder, T., et al. U.S. Appl. No. 17/842,272, filed Jun. 16, 2022.
Seder, T., et al. U.S. Appl. No. 18/153,767, filed Jan. 12, 2023.
Seder, T., et al. U.S. Appl. No. 18/153,779, filed Jan. 12, 2023.
Seder, T., et al. U.S. Appl. No. 18/153,783, filed Jan. 12, 2023.
Seder, T., et al. U.S. Appl. No. 18/325,255, filed May 30, 2023.
Sharma, M., et al. U.S. Appl. No. 17/888,767, filed Aug. 16, 2022.
Szczerba, J., et al. U.S. Appl. No. 18/153,776, filed Jan. 12, 2023.
Szczerba, J., et al. U.S. Appl. No. 18/153,790, filed Jan. 12, 2023.
U.S. Appl. No. 17/842,253, filed Jun. 16, 2022.
U.S. Appl. No. 17/842,272, filed Jun. 16, 2022.
U.S. Appl. No. 17/888,767, filed Aug. 16, 2022.
U.S. Appl. No. 18/153,767, filed Jan. 12, 2023.
U.S. Appl. No. 18/153,776, filed Jan. 12, 2023.
U.S. Appl. No. 18/153,779, filed Jan. 12, 2023.
U.S. Appl. No. 18/153,783, filed Jan. 12, 2023.
U.S. Appl. No. 18/153,790, filed Jan. 12, 2023.
U.S. Appl. No. 18/325,255, filed May 30, 2023.

* cited by examiner

CAMPFIRE DISPLAY WITH POLARIZATION OPTICS

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing. Additionally, it may be desirable to provide a method and system for improving passenger satisfaction through presentation of relevant information in a format that is easily understandable by passengers.

While current systems achieve their intended purpose, there is a need for a new and improved system for providing a floating three-dimensional image that appears centrally located within the vehicle to all the passengers within the vehicle, and provides a camp-fire like viewing atmosphere where the passengers can all view a common floating image, or each passenger can view a unique floating image, wherein the system provides a high quality image for the passengers.

SUMMARY

According to several aspects of the present disclosure, a method of using a system for generating a centrally located floating image display within a Pepper's ghost image chamber for a plurality of passengers positioned within a vehicle compartment of a vehicle includes filtering, with a linear polarizer positioned between a transparent display and reflectors of the Pepper's ghost image chamber within, light traveling from the transparent display toward the reflectors, to increase the contrast of the image displayed within the Pepper's ghost image chamber.

According to another aspect, the method further includes displaying, with a first display of the image chamber in communication with a system controller, a first image, receiving, with a first reflector individually associated with a first passenger, the first image from the first display, reflecting, with the first reflector, the first image to the first passenger, wherein the first passenger perceives the first image floating at a central location within the image chamber, displaying, with a second display of the image chamber in communication with a system controller, a second image, receiving, with a second reflector individually associated with a second passenger, the second image from the second display, reflecting, with the second reflector, the second image to the second passenger, wherein the second passenger perceives the second image floating at the central location within the image chamber, and displaying, with a transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber.

According to another aspect, the filtering, with a linear polarizer positioned between the transparent display and the first reflector and between the transparent display and the second reflector, light traveling from the transparent display toward the first reflector and the second reflector further includes, filtering with the linear polarizer light traveling from the transparent display toward the first reflector and the second reflector and allowing only S-Polarized light to pass through the linear polarizer toward the first reflector and the second reflector.

According to another aspect, the displaying, with the first display of the image chamber in communication with the system controller, a first image, further includes displaying, with the first display of the image chamber, a first image comprising only S-Polarized light, and the displaying, with the second display of the image chamber in communication with the system controller, a second image, further includes displaying, with the second display of the image chamber, a second image comprising only S-Polarized light.

According to another aspect, the method further includes reflecting, with the first reflector, S-Polarized light traveling from the linear polarizer toward the first reflector, toward the first display, reflecting, with the second reflector, S-Polarized light traveling from the linear polarizer toward the second reflector, toward the second display; deflecting, with a first cover glass on the first display, a first portion of light reflected to the first display, by the first reflector, away from the first reflector; reflecting, with the first cover glass on the first display, a second portion of light reflected to the first display, by the first reflector, back toward the first reflector; reflecting, with the first reflector, light reflected from the first cover glass toward the linear polarizer; deflecting, with a second cover glass on the second display, a first portion of light reflected to the second display, by the second reflector, away from the second reflector; reflecting, with the second cover glass on the second display, a second portion of light reflected to the second display, by the second reflector, back toward the second reflector; and reflecting, with the second reflector, light reflected from the second cover glass toward the polarizer.

According to another aspect, the method further includes converting, with a quarter wave plate positioned between the linear polarizer and the first reflector and between the linear polarizer and the second reflector, linear S-Polarized light traveling from the linear polarizer toward the first reflector to circularly polarized light; converting, with the quarter wave plate, linear S-Polarized light traveling from the linear polarizer toward the second reflector to circularly polarized light; converting, with the quarter wave plate, circularly polarized light reflected, by the first reflector, toward the linear polarizer, to linear polarization; and converting, with the quarter wave plate, circularly polarized light reflected, by the second reflector, toward the linear polarizer, to linear polarization.

According to another aspect, each of the first reflector and the second reflector is a polarizing beam splitter adapted to reflect only S-Polarized light.

According to several aspects of the present disclosure, a system for generating a centrally located floating image display for a plurality of passengers positioned within a vehicle compartment within a vehicle includes a Pepper's ghost image chamber, and a linear polarizer positioned between a transparent touch screen display and reflectors of the Pepper's ghost image chamber, the linear polarizer adapted to filter light traveling from the transparent display toward the reflectors and increase contrast of the image displayed within the Pepper's ghost image chamber.

According to another aspect, the system further includes a system controller, the image chamber including: a first display adapted to project a first image, a first reflector individually associated with the first display and a first one of the plurality of passengers, the first reflector adapted to receive the first image from the first display and to reflect the first image to the first passenger, wherein the first passenger perceives the first image floating at a central location within the image chamber, a second display adapted to project a second image, and a second reflector individually associated with the second display and a second one of the plurality of passengers, the second reflector adapted to receive the second image from the second display and to reflect the second image to the second passenger, wherein, the second passenger perceives the second image floating at the central location within the image chamber; and, the transparent touch screen display positioned between the first reflector and the first passenger and between the second reflector and the second passenger and adapted to display first private information to the first passenger within an image plane positioned in front of the first image floating at the central location within the image chamber and to receive input from the first passenger, and adapted to display second private information to the second passenger within an image plane positioned in front of the second image floating at the central location within the image chamber and to receive input from the second passenger.

According to another aspect, the linear polarizer is adapted to allow only S-Polarized light to pass through the linear polarizer toward the first reflector and the second reflector, and the first display is adapted to display a first image comprising only S-Polarized light, and the second display is adapted to display a second image comprising only S-Polarized light.

According to another aspect, the first reflector is adapted to reflect S-Polarized light traveling from the linear polarizer toward the first reflector, to the first display, and the second reflector is adapted to reflect S-Polarized light traveling from the linear polarizer toward the second reflector, to the second display.

According to another aspect, the system further includes a first cover glass positioned on the first display and adapted to deflect a first portion of light reflected to the first display by the first reflector, away from the first reflector and to reflect a second portion of light reflected to the first display, by the first reflector, back to the first reflector, the first reflector adapted to reflect light from the first cover glass toward the linear polarizer, and a second cover glass positioned on the second display and adapted to deflect a first portion of light reflected to the second display by the second reflector, away from the second reflector and to reflect a second portion of light reflected to the second display, by the second reflector, back to the second reflector, the second reflector adapted to reflect light from the second cover glass toward the linear polarizer.

According to another aspect, the system further includes a quarter wave plate positioned between the linear polarizer and the first reflector and between the linear polarizer and the second reflector, the quarter wave plate adapted to: convert linear S-Polarized light traveling from the polarizer toward the first reflector to circularly polarized light; convert linear S-Polarized light traveling from the polarizer toward the second reflector to circularly polarized light; convert circularly polarized light reflected, by the first reflector, toward the polarizer, to linear polarization; and convert circularly polarized light reflected, by the second reflector, toward the polarizer, to linear polarization.

According to another aspect, each of the first reflector and the second reflector is a polarizing beam splitter adapted to reflect only S-Polarized light.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
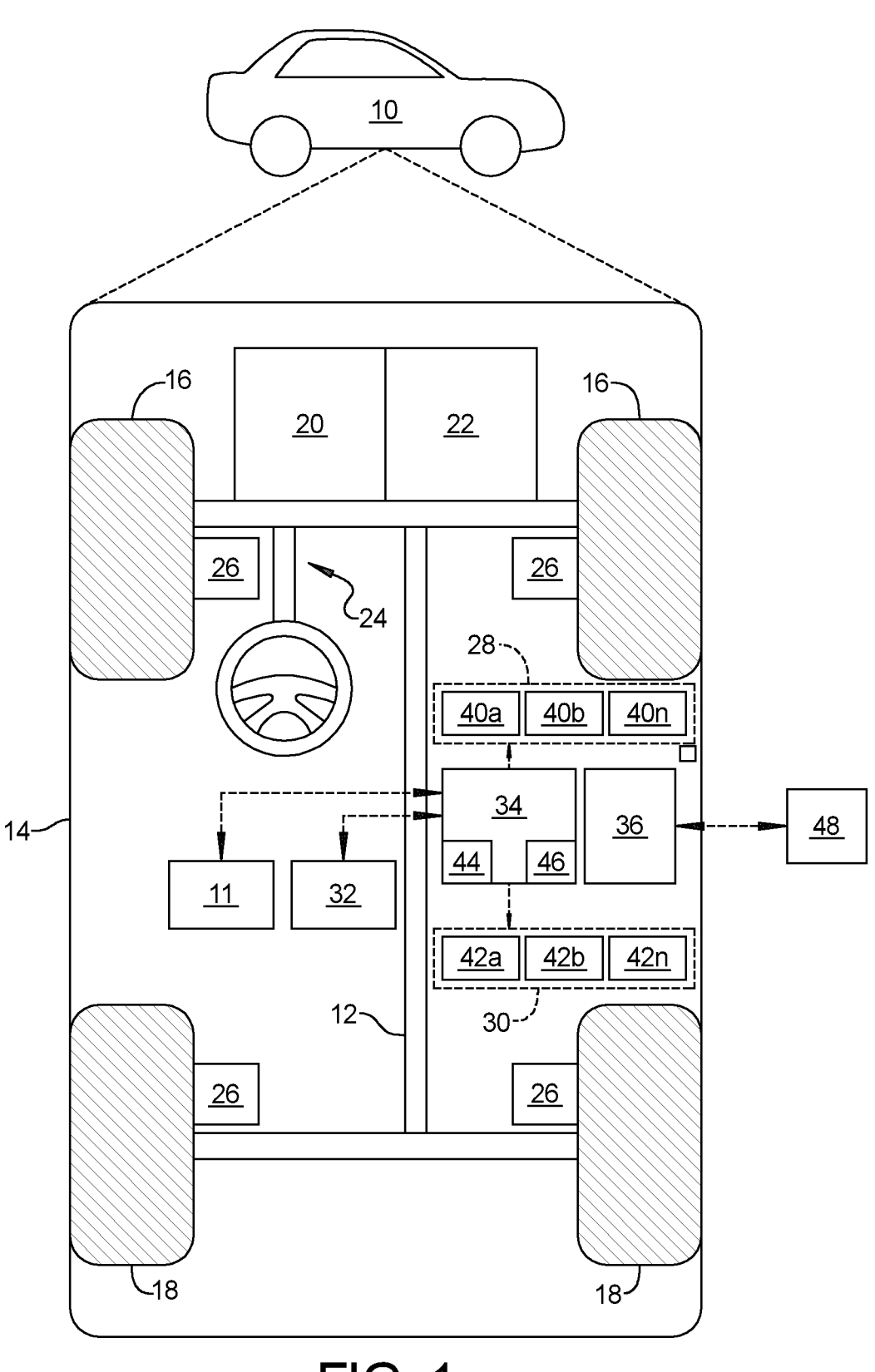
FIG. 1 is a schematic diagram of a vehicle having a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for generating a centrally located floating three-dimensional image 50 display for a plurality of passengers 52 positioned within the vehicle 10 in accordance with various embodiments. In general, the hybrid head-up display system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10.

In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10.

In another exemplary embodiment, at least one of the plurality of sensing devices 40a-40n is capable of measuring distances in the environment surrounding the vehicle 10. In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
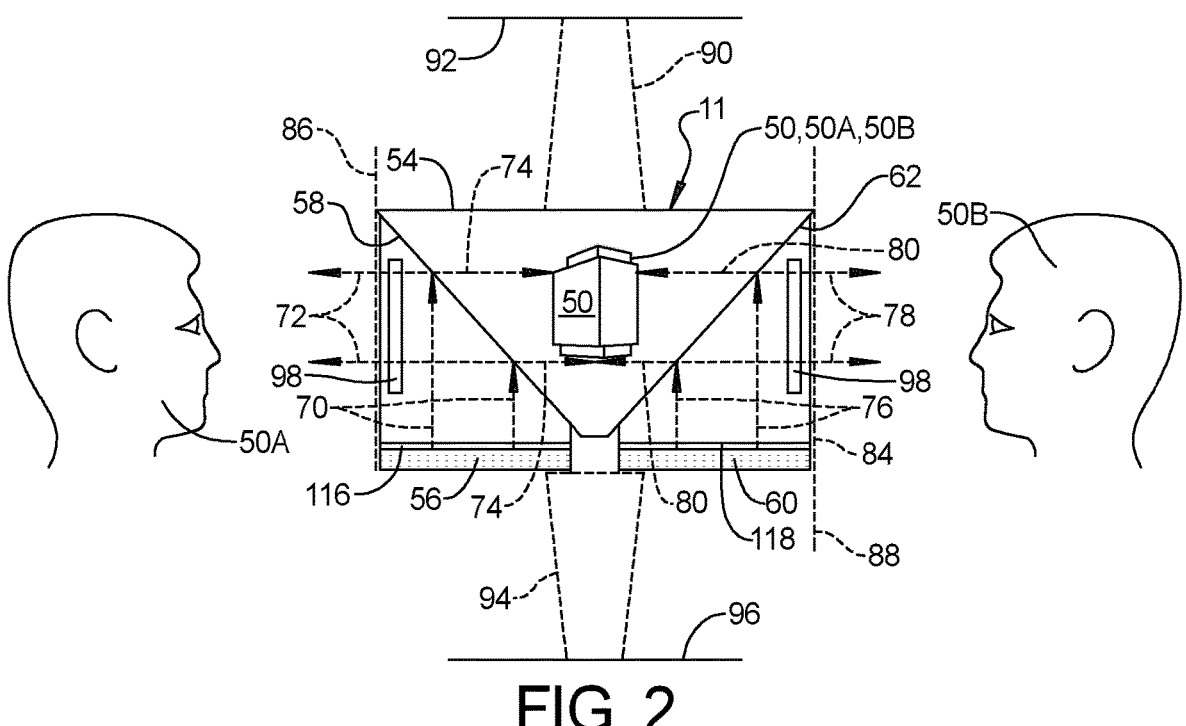
FIG. 2 is a schematic side view of a system in accordance with an exemplary embodiment of the present disclosure.
Figure 3:
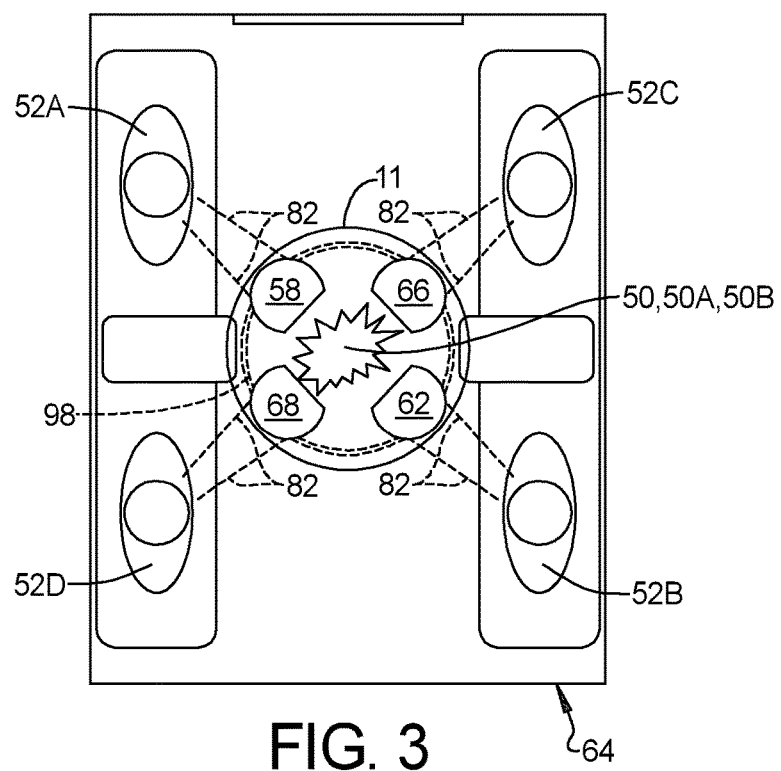
FIG. 3 is a top view of a vehicle compartment having a system in accordance with an exemplary embodiment of the present disclosure.

Referring to FIG. 2 and FIG. 3, the system 11 for generating a centrally located floating three-dimensional image 50 display for a plurality of passengers 52 positioned within a vehicle, includes an image chamber 54 that includes a first display 56 in communication with the system controller 34 and is adapted to project a first image 50A and a first reflector 58 individually associated with the first display 56 and a first one 52A of the plurality of passengers 52, and a second display 60 that is adapted to project a second image 50B and a second reflector 62 individually associated with the second display 60 and a second one 52B of the plurality of passengers 52. As shown in FIG. 2, the system 11 includes two displays 56, 60 reflectors 58, 62 and passengers 52A, 52B. It should be understood that the system 11 may be adapted to accommodate any suitable number of passengers 52.

Referring to FIG. 3, a vehicle compartment 64 includes a plurality of seating positions occupied by a plurality of passengers 52A, 52B, 52C, 52D. As shown, the vehicle compartment 64 includes four seating positions for four passengers 52A, 52B, 52C, 52D. Each reflector 58, 62, 66, 68 is adapted to be viewed by one of the passengers 52A, 52B, 52C, 52D. Each reflector 58, 62, 66, 68 is adapted to receive an image from an associated display and to reflect the image to the associated passenger 52. The associated passenger 52 perceives the image 50 floating at a central location within the image chamber 54.

Referring again to FIG. 2, the first reflector 58 is adapted to receive the first image 50A from the first display 56, as indicated by arrows 70, and to reflect the first image 50A to the first passenger 52A, as indicated by arrows 72, wherein the first passenger 52A perceives the first image 50A floating at a central location within the image chamber 54, as indicated by arrows 74. The second reflector 62 is adapted to receive the second image 50B from the second display 60, as indicated by arrows 76, and to reflect the second image 50B to the second passenger 52B, as indicated by arrows 78, wherein, the second passenger 52B perceives the second image 50B floating at the central location within the image chamber 54, as indicated by arrows 80.

Referring again to FIG. 3, each of the four passengers 52A, 52B, 52C, 52D perceives an image 50 reflected to them by respective associated reflectors 58, 62, 66, 68 and the passengers 52A, 52B, 52C, 52D perceive the image 50 reflected to them within the image chamber 54, as indicated by lines 82. The first display 56 is associated with the first reflector 58, the second display 60 is associated with the second reflector 62 and third and fourth displays (not shown) are associated with the third and fourth reflectors 66, 68 respectively. Each of the first, second, third and fourth displays 56, 60 can project the same image to each of the reflectors 58, 62, 66, 68 and thus to each of the passengers 52A, 52B, 52C, 52D. Alternatively, each of the displays 18, 22 can display a different perspective of the same image, or a different image altogether to each of the reflectors 58, 62, 66, 68. Thus the system 11 is capable of presenting the same floating image 50 to all the passengers 52 so they can view simultaneously, or alternatively, each passenger 52 can view a different perspective of the floating image 50 or a completely different three-dimensional image 50.

A transparent display 84 is positioned between the eyes of each of the plurality of passengers 52 and the reflectors 58, 62, 66, 68. As shown in FIG. 2, the transparent display 84 is positioned between the first reflector 58 and the first passenger 52A and between the second reflector 62 and the second passenger 52B. The transparent display 84 is adapted to display information to the first and second passengers 52A, 52B within an image plane positioned in front of the perceived first and second images 50A, 50B floating at the central location within the image chamber 54. The transparent display 84 presents first private information to the first passenger 52A that appears within a first image plane 86, wherein the first private information displayed on the transparent display 84 to the first passenger 52A appears in front of the image 50A perceived by the first passenger 52A within the image chamber 54. The first private information is information meant to be seen only by the first passenger 52A. The transparent display 84 presents second private information to the second passenger 52B that appears within a second image plane 88, wherein second private information displayed on the transparent display 84 to the second passenger 52B appears in front of the image 50B perceived by the second passenger 52B within the image chamber 54. The second private information is information meant to be seen only by the second passenger 52B.

In an exemplary embodiment, the transparent display 84 is a transparent touch screen that is adapted to allow the plurality of passengers 52 to receive annotated information and to provide input to the system 11. Referring to FIG. 2, in an exemplary embodiment, the transparent display 84 includes a clear cylindrical touch screen. The clear cylindrical touch screen encircles the image chamber 54 and is thereby positioned between the eyes of the plurality of passengers 52 and the perceived image 50 floating at the central location within the image chamber 54. In an exemplary embodiment, the transparent display 84 is an organic light-emitting diode (OLED). It should be understood, that the transparent display 84 may be other types of transparent touch screen displays known in the art.

The transparent display 84 is adapted to present visible displayed information only to the passenger 52 that is directly in front of a portion of the transparent display 84. The nature of the transparent display 84 is such that the displayed information is only displayed on a first side, the outward facing cylindrical surface, of the transparent display 84. A second side, the inward facing cylindrical surface, of the transparent display 84 does not display information, and thus, when viewed by the other passengers 52, allows the other passengers 52 to see through the transparent display 84.

In an exemplary embodiment, the images from each of the displays 56, 60 are generated via holographic method, pre-computed and encoded into a hologram generator within the display 56, 60. In an exemplary embodiment, each display 56, 60 is adapted to project a three-dimensional image with variable virtual image distance. Three-dimensional images with variable virtual image distance allows the system 11 to project a floating image 50 to the passengers 52 with the capability of making the floating image 50 appear closer or further away from the passengers 52.

Referring again to FIG. 2, in an exemplary embodiment, the system 11 is mounted to a support structure 90 suspended from a roof 92 within the vehicle compartment 64. Alternatively, in another exemplary embodiment, the system 11 is mounted to a support structure 94, such as a pedestal, mounted to a floor 96 within the vehicle compartment 64. In various embodiments, the system 11 may be retractable, wherein, when not in use, the system 11 recesses within the roof 92 or the floor 96 within the vehicle compartment 64.

The transparent display 84 and each of the reflectors 58, 62, 66, 68 are transparent, wherein a passenger 14 can see through the transparent display 46 and an associated reflector 58, 62, 66, 68. This allows the passenger 52 to perceive the floating image 50 at a distance beyond the reflector 58, 62, 66, 68 and further, allows the passenger 52 to see through the transparent display 84 and the reflectors 58, 62, 66, 68 and able to see the interior of the vehicle compartment 64 and other passengers 52 therein.

In one exemplary embodiment, the transparent display 84 is an autostereoscopic display that is adapted to display stereoscopic, or three-dimensional images by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D". The autostereoscopic transparent display includes a display panel and a parallax barrier mounted to the display panel, on an outwardly facing side of the display panel facing an associated one of the plurality of passengers 52. In an exemplary embodiment the parallax barrier that is mounted onto the transparent display 84 includes a plurality of parallel, vertical apertures, that divide the image displayed such that a left eye and a right eye of a passenger 52 viewing the autostereoscopic display see different portions of the displayed image and the passenger 52 perceives a three-dimensional image.

In an exemplary embodiment, the parallax barrier that is mounted onto the transparent display 84 is selectively actuatable by a controller adapted to switch between having the parallax barrier off, wherein the parallax barrier is completely transparent, and the viewing passenger 52 sees images displayed on the transparent display 84 as two-dimensional images, and having the parallax barrier on, wherein the viewing passenger 52 sees the images displayed on the transparent display 84 as a three-dimensional images.

When the parallax barrier is actuated, each of the left and right eyes of the viewing passenger 52 only see half of the displayed image, therefore, the resolution of the three-dimensional image is reduced. To improve resolution, in one exemplary embodiment, the controller is configured to implement time-multiplexing by alternately turning the parallax barrier on and off. Time-multiplexing requires the system 11 to be capable of switching the parallax barrier on and off fast enough to eliminate any perceptible image flicker by the viewing passenger 52. Liquid crystal displays are particularly suitable for such an application.

Referring again to FIG. 2, the system 11 includes a linear polarizer 98 positioned between the transparent display 84 and the first reflector 58 and between the transparent display 84 and the second reflector 62. In an exemplary embodiment, the linear polarizer 98 is cylindrical in shape and extends around the image chamber 54 within the cylindrical transparent display 84, between the transparent display 84 and each of the reflectors 58, 62, 66, 68. The linear polarizer 98 is adapted to filter light traveling from the transparent display 84 toward the first reflector 58 and the second reflector 62.

Figure 4:
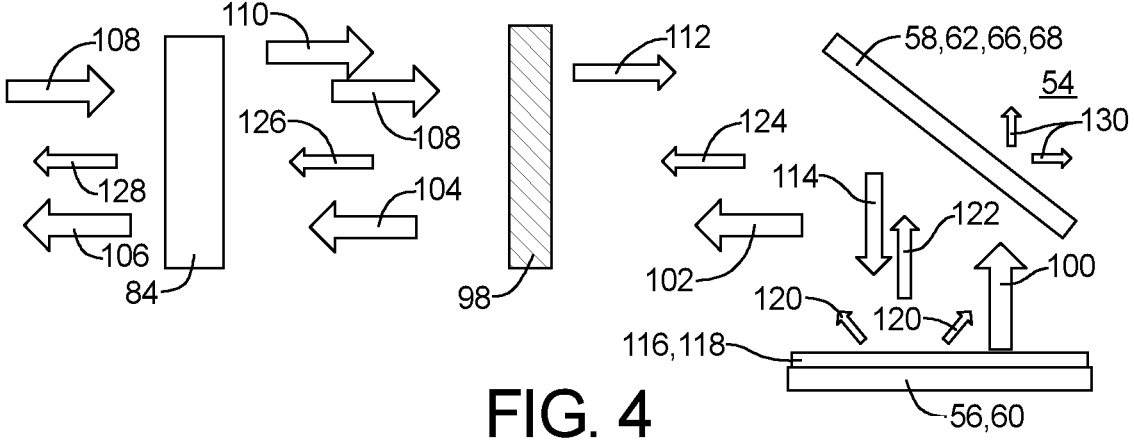
FIG. 4 is a schematic side view of a transparent display, linear polarizer, reflectors and displays of the system shown in FIG. 2 and FIG. 3.

Referring to FIG. 4, the displays 56, 60, project light comprising the images 50 upward toward the reflectors 58, 62, 66, 68, as indicated by arrow 100. The reflectors 58, 62, 66, 68 reflect the light from the displays 56, 60, outward toward the transparent display 84, as indicated by arrow 102, through the polarizer 98, as indicated by arrow 104, and through the transparent display 84 to the eyes of the passengers 52, as indicated by arrow 106. Ambient light from outside the transparent display 84 passes through the transparent display 84 toward the reflectors 58, 62, 66, 68, as indicated by arrows 108. Further, light given off by the transparent display 84 travels toward the reflectors 58, 62, 66, 68, as indicated by arrow 110. When such ambient light and light given off by the transparent display 84 leaks into the image chamber 54, contrast of the floating image 50 within the image chamber 54 is diminished, reducing the quality of the displayed floating image 50. In an exemplary embodiment, the linear polarizer 98 is adapted to allow only S-Polarized light to pass through the linear polarizer 98 toward the reflectors 58, 62, 66, 68.

The linear polarizer 98 is positioned between the transparent display 84 and the reflectors 58, 62, 66, 68, and is adapted to allow only S-polarized light to pass through. Light is an electromagnetic wave, and the electric field of this wave oscillates perpendicularly to the direction of propagation. Light is called unpolarized or randomly polarized if the direction of this electric field fluctuates randomly in time. Many common light sources such as sunlight, halogen lighting, LED spotlights, and incandescent bulbs produce unpolarized light. If the direction of the electric field of light is well defined, it is called polarized light. The two orthogonal linear polarization states that are most important for reflection and transmission are referred to as P-polarization and S-polarization. P-polarized light has an electric field polarized parallel to the plane of incidence, while S-polarized light is perpendicular to this plane. The polarizer 98 is any suitable device that is adapted to allow only S-polarized light to pass through, and blocks P-polarized light from passing through.

Thus, because the linear polarizer 98 allows only S-polarized light to pass through, and blocks P-polarized light from passing through, approximately 50% of the ambient light passing through the transparent display 84, as indicated by arrows 108, and 50% of the light given off by the transparent display 84, as indicated by arrow 110 is allowed to pass through the linear polarizer 98, resulting in 50% less light propagating toward the reflectors 58, 62, 66, 68, as indicated by arrow 112. In addition, the linear polarizer 98 will attenuate light passing through it by up to an additional 10% due to the materials used in manufacturing polymer polarizers that accept a wide spectral bandwidth and have a large angle of acceptance.

In an exemplary embodiment, the reflectors 58, 62, 66, 68 are adapted to reflect S-Polarized light traveling from the linear polarizer toward the reflectors 58, 62, 66, 68, as indicated by arrow 112, to the displays 56, 60, as indicated by arrow 114. Referring to FIG. 2, in an exemplary embodiment, the system 11 includes a first cover glass 116 positioned on the first display 56, and a second cover glass 118 positioned on the second display 60.

Referring again to FIG. 4, the first and second cover glass 116, 118, positioned on the first and second displays 56, 60, as well as third and fourth cover glass (not shown individually) associated with third and fourth displays (not shown individually). The displays 56, 60 being covered in glass provides for natural reflection of a small portion of any incident light (approximately 4%), additionally, the cover glass 116, 118 has a curved profile and/or are coated with an anti-reflective coating, wherein, the cover glass 116, 118 is adapted to receive light reflected to the displays 56, 60, as indicated by arrow 114, and deflect a first portion of such light away from the reflectors, as indicated by arrows 120. Additionally, the first and second cover glass 116, 118, positioned on the first and second displays 56, 60, as well as third and fourth cover glass (not shown individually) associated with third and fourth displays (not shown individually), are adapted to reflect a second portion of such light back to the reflectors 58, 62, 66, 68, as indicated by arrow 122, wherein the reflectors 58, 62, 66, 68 are adapted to reflect such light from the cover glass 116, 118 toward the polarizer 98, as indicated by arrow 124.

The curved profile and/or anti-reflective coating helps reduce the amount of light comprising the second portion that is reflected back to the reflectors, as indicated by arrows 122. Thus, the amount of light that is reflected by the reflectors 58, 62, 66, 68, as indicated by arrow 124 is minimized, thus reducing the amount of such light that propagates back through the linear polarizer 98, as indicated by arrow 126, and the amount of such light that propagates back through the transparent display 84, as indicated by arrow 128, and thus reducing the amount of such light that reaches the eyes of the passenger 52 and affects the contrast of the image 50 perceived within the image chamber 54 by the passenger 52.

The amount of such light passing through the linear polarizer 98 toward to transparent display 84 is not reduced dramatically, as this light is already S-Polarized, however, this light is further attenuated by up to an additional 10% during the second pass through the linear polarizer 98 (arrows 124 and 126) due to the materials used in manufacturing polymer polarizers that accept a wide spectral bandwidth and have a large angle of acceptance. Thus further reducing the amount of such light that propagates back through the linear polarizer 98, as indicated by arrow 126, and the amount of such light that propagates back through the transparent display 84, as indicated by arrow 128, and thus further reducing the amount of such light that reaches the eyes of the passenger 52 and affects the contrast of the image 50 perceived within the image chamber 54 by the passenger 52.

In an exemplary embodiment, the first display 56 and the second display 60 are adapted to display images comprising only S-Polarized light. Further, each of the reflectors 58, 62, 66, 68 is a polarizing beam splitter adapted to reflect only S-Polarized light, and to allow P-Polarized light to pass therethrough. Thus, any P-polarized light that is incident upon the reflectors 58, 62, 66, 68 passes through the reflectors 58, 62, 66, 68, and out of the display, as indicated by arrows 130.

Figure 5:
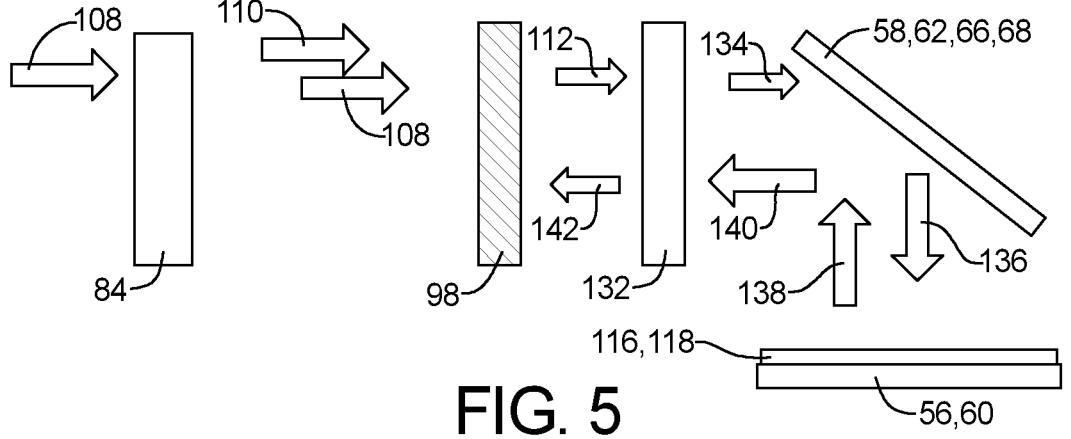
FIG. 5 is the schematic side view of FIG. 4, including a quarter wave plate.

Referring to FIG. 5, in an exemplary embodiment, the system 11 further includes a quarter wave plate 132 positioned between the linear polarizer 98 and the reflectors 58, 62, 66, 68. In embodiments including the quarter wave plate 132, it should be understood by those skilled in the art that the reflectors 58, 62, 66, 68 may be basic mirrors or polarizing beam splitters as discussed above. Ambient light from outside the transparent display 84 passes through the transparent display 84 toward the reflectors 58, 62, 66, 68, as indicated by arrows 108. Further, light given off by the transparent display 84 travels toward the reflectors 58, 62, 66, 68, as indicated by arrow 110. Approximately 50% of the ambient light passing through the transparent display 84, as indicated by arrows 108, and 50% of the light given off by the transparent display 84, as indicated by arrow 110 is allowed to pass through the linear polarizer 98, resulting in 50% less light propagating toward the reflectors 58, 62, 66, 68, as indicated by arrow 112. In addition, the linear polarizer 98 will attenuate light passing through it by up to an additional 10% due to the materials used in manufacturing polymer polarizers that accept a wide spectral bandwidth and have a large angle of acceptance.

The light passing through the linear polarizer, as indicated by arrow 112, passes through the quarter wave plate 132, as indicated by arrow 134. The quarter wave plate 132 is adapted to convert linear S-Polarized light traveling from the linear polarizer 98 toward the reflectors 58, 62, 66, 68, as indicated by arrow 112 to circularly polarized light, as indicated by arrow 134. Passing linearly polarized light through a quarter wave plate with its axes at 45° to its polarization axis will convert it to circular polarization. Likewise, circularly polarized light can be converted into linearly polarized light by passing it through a quarter wave plate. Such circularly polarized light is reflected, by the reflectors 58, 62, 66, 68, to the displays 56, 60, as indicated by arrow 136. A portion of such circularly polarized light is reflected by the displays 56, 60 and the cover glass 116, 118 back to the reflectors, as indicated by arrow 138, and as discussed above.

The circularly polarized light from the displays 56, 60, as indicated by arrow 138, is reflected, by the reflectors 58, 62, 66, 68 back to the quarter wave plate 132, as indicated by arrow 140, passes through the quarter wave plate 132, toward the linear polarizer 98, and is converted, by the quarter wave plate 132, back to linearly polarized light. When such light makes this second pass through the quarter wave plate 132, an additional phase factor to the light is added relative to the original. The light exiting the quarter wave plate 132, as indicated by arrow 142, is linearly polarized, however, rotated by 90 degrees to the incident light. This light will be blocked by the linear polarizer 98 up to the polarization ratio of the linear polarizer, which is typically 100:1 or 1000:1. Thus further reducing, and possibly eliminating, the amount of light that propagates back through the linear polarizer 98 and the transparent display 84, and further reducing the amount of such light that reaches the eyes of the passenger 52 and affects the contrast of the image 50 perceived within the image chamber 54 by the passenger 52.

Figure 6:
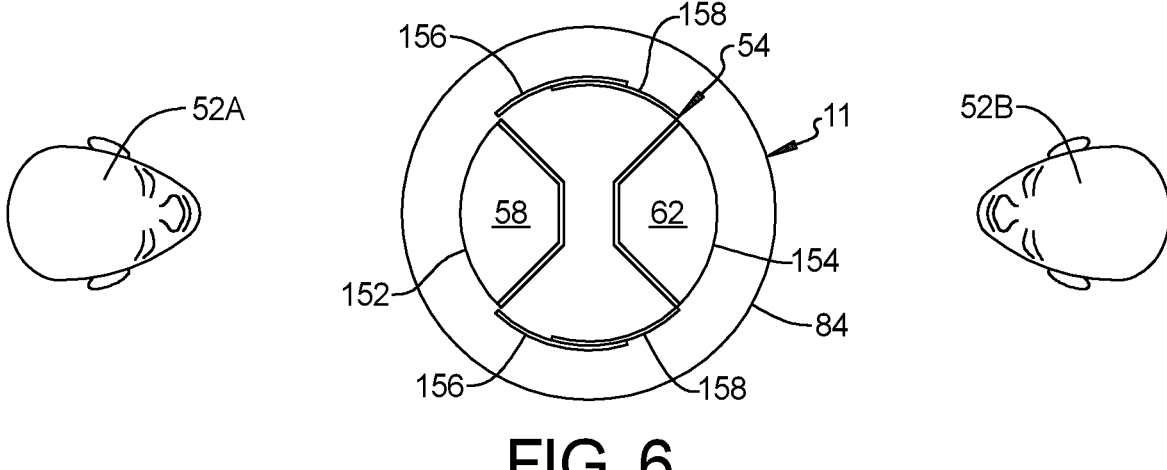
FIG. 6 is a schematic top view of the system shown in FIG. 2 with a first and second passenger.

Referring to FIG. 6, the image chamber 54 includes transparent portions 152, 154 to allow the passengers 52 to see their associated reflector 58, 62. As shown, the image chamber 54 includes a first transparent portion 152 that is adapted to allow the first image 50A reflected by the first reflector 58 to pass from the image chamber 54 outward toward the first passenger 52A, as indicated by arrows 72 in FIG. 2. Further, the image chamber 54 includes a second transparent portion 154 that is adapted to allow the second image 50B reflected by the second reflector 62 to pass from the image chamber 54 outward toward the second passenger 52B, as indicated by arrows 78 in FIG. 2.

The image chamber 54 further includes solid portions 156, 158 that are adapted to prevent light from entering the image chamber 54 behind the first and second reflectors 58, 62. The image chamber 54 functions much like a Pepper's Ghost Chamber, wherein the image of an object is perceived by a viewer within a reflective surface adjacent the actual image. As discussed above, in the present disclosure, the image presented by a display 56, 60 which is not within view of a passenger 52, is reflected by a reflector 58, 62, 66, 68 to the passenger 52A, 52B, 52C, 52D such that the passenger "sees" the image 50 within the image chamber 54 and perceives the image 50 to be floating behind the reflective surface of the reflector 58, 62, 66, 68. If the image chamber 54 behind the reflectors 58, 62, 66, 68 is exposed to ambient light, the image 50 will not be viewable by the passengers 52. Thus, solid portions 156, 158 of the image chamber 54 are adapted to prevent light from entering the image chamber 54 behind the first and second reflectors 58, 62. Referring to FIG. 6, the image chamber 54 includes solid overlapping panels 156, 158 that are adapted to prevent light from entering the image chamber 54 behind the first and second reflectors 58, 62.

Figure 7:
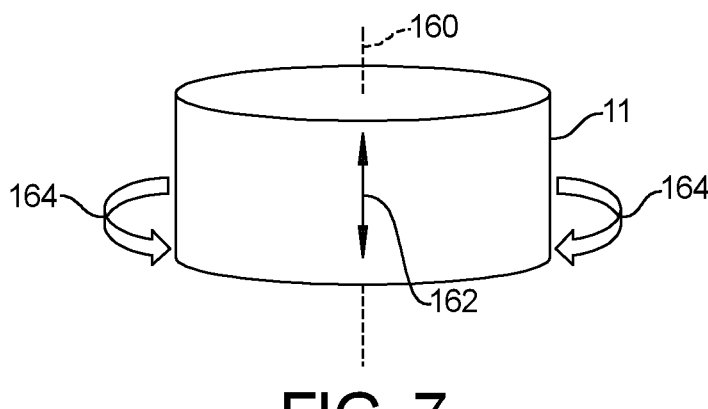
FIG. 7 is a schematic perspective view of the system shown in FIG. 2.

Referring to FIG. 7, in an exemplary embodiment, the system 11 is selectively moveable vertically up and down along a vertical central axis 160, as indicated by arrow 162. Further, each display 56, 60 and the associated reflector 58, 62, 66, 68 are unitarily and selectively rotatable about the vertical central axis 160, as shown by arrows 164. This allows the system 11 to adjust to varying locations of the passengers 52 within the vehicle compartment 64.

Figure 8:
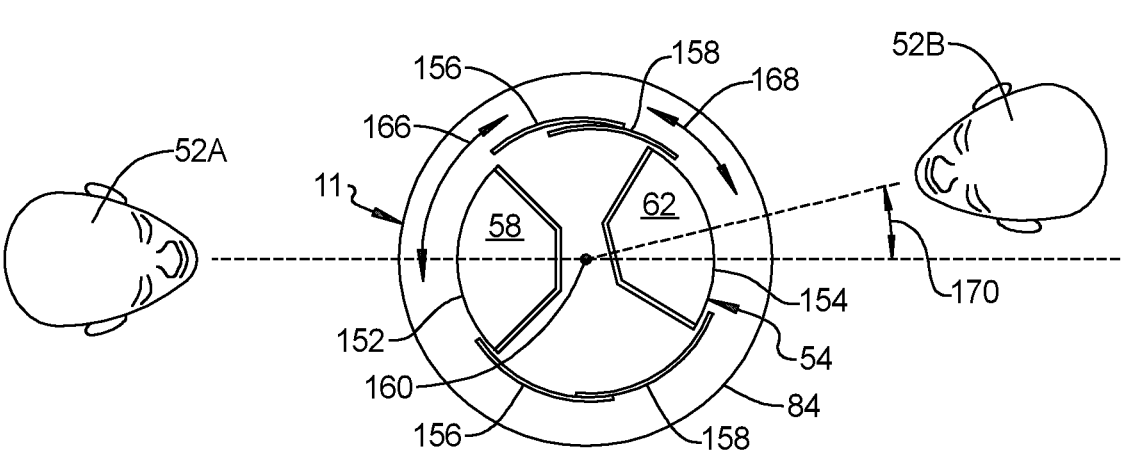
FIG. 8 is a schematic top view of the system shown in FIG. 6, wherein the position of the second passenger has moved.

Referring to FIG. 8, the first reflector 58 and the first display 56 are rotatable about the vertical central axis 160, as indicated by arrow 166. The second reflector 62 and the second display 60 are rotatable about the vertical central axis 160, as indicated by arrow 168. As shown in FIG. 6, the first and second passengers 53A, 52B are sitting directly across from one another, and the first reflector 58 and first display 56 are positioned 180 degrees from the second reflector 62 and second display 60. As shown in FIG. 8, the position of the head of the second passenger 52B has moved, and the second reflector 62 and the second display 60 have been rotated an angular distance 170 to ensure the second passenger 52B perceives the image 50 from the second display 60 and the second reflector 62.

In an exemplary embodiment, the image chamber 54 includes first solid panels 156 positioned adjacent the first reflector 58 on either side and adapted to move unitarily with the first reflector 58 and the first display 56 as the first reflector 58 and the first display 56 rotate about the vertical central axis 160. Second solid panels 158 are positioned adjacent the second reflector 62 on either side and are adapted to move unitarily with the second reflector 62 and the second display 60 as the second reflector 62 and the second display 60 rotate about the vertical central axis 160. The first solid panels 156 overlap the second solid panels 158 to allow relative movement of the first solid panels 156 relative to the second solid panels 158 and to ensure that ambient light is blocked from entering the image chamber 54 behind the first and second reflectors 58, 62 at all times.

Figure 9:
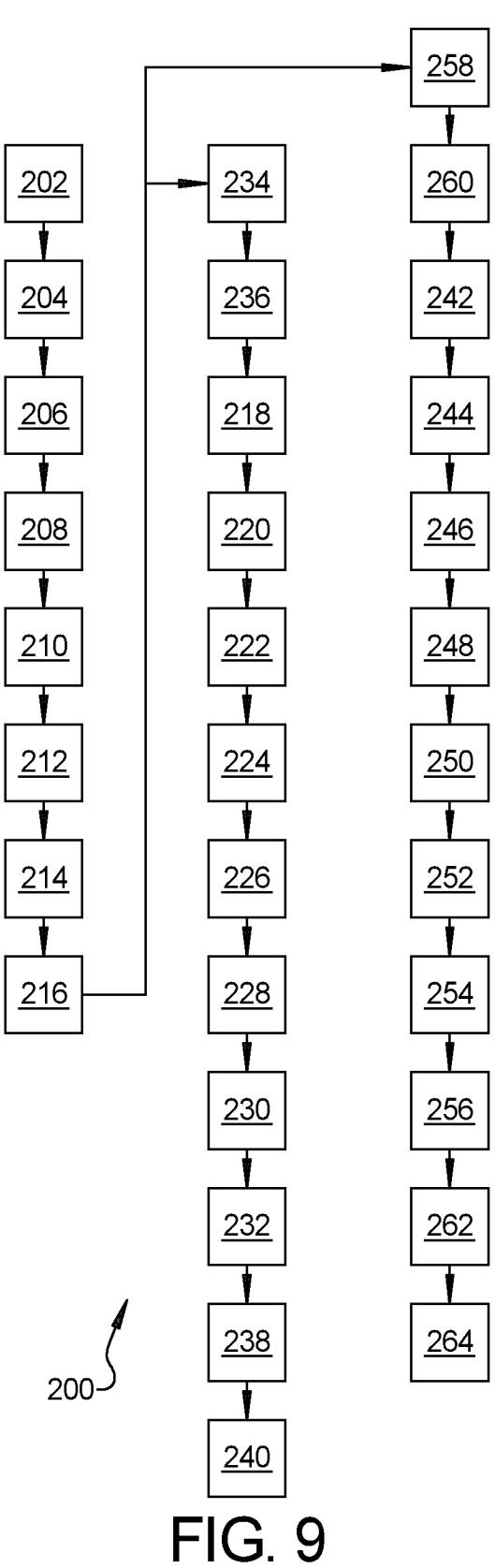
FIG. 9 is a flow chart illustrating a method according to an exemplary embodiment of the present disclosure.

Referring to FIG. 9, a method 200 of using a system 11 for generating a centrally located floating three-dimensional image 50 display for a plurality of passengers 52 positioned within a vehicle compartment 64 of a vehicle 10, includes, beginning at block 202, displaying, with a first display 56 of an image chamber 54 in communication with a system controller 34, a first image 50A, moving to block 204, receiving, with a first reflector 58 individually associated with a first passenger 52A, the first image 50A from the first display 56, moving to block 206, reflecting, with the first reflector 58, the first image 50A to the first passenger 52A, wherein the first passenger 52A perceives the first image 50A floating at a central location within the image chamber 54, moving to block 208, displaying, with a second display 60 of the image chamber 54 in communication with a system controller 34, a second image 50B, moving to block 210, receiving, with a second reflector 62 individually associated with a second passenger 52B, the second image 50B from the second display 60, moving to block 212, reflecting, with the second reflector 62, the second image 50B to the second passenger 52B, wherein the second passenger 52B perceives the second image 50B floating at the central location within the image chamber 54, moving to block 214, displaying, with a transparent display 84 in communication with the system controller 34 and positioned between eyes of the first passenger 52A and the first reflector 58 and between the eyes of the second passenger 52B and the second reflector 62, first private information to the first passenger 52A within a first image plane 86 positioned in front of the first image 50A floating at the central location within the image chamber 54 and second private information to the second passenger 52B within a second image plane 88 positioned in front of the second image 50B floating at the central location within the image chamber 54, and, moving to block 216, filtering, with a linear polarizer 98 positioned between the transparent display 84 and the first reflector 58 and between the transparent display 84 and the second reflector 62, light traveling from the transparent display 84 toward the first reflector 58 and the second reflector 62.

In an exemplary embodiment, the filtering, with a linear polarizer 98 positioned between the transparent display 84 and the first reflector 58 and between the transparent display 84 and the second reflector 62, light traveling from the transparent display 84 toward the first reflector 58 and the second reflector 62 at block 216 further includes, filtering with the linear polarizer 98 light traveling from the transparent display 84 toward the first reflector 58 and the second reflector 62 and allowing only S-Polarized light to pass through the linear polarizer 98 toward the first reflector 58 and the second reflector 62.

In another exemplary embodiment, the displaying, with the first display 56 of the image chamber 54 in communication with the system controller 34, a first image 50A at block 202 further includes displaying, with the first display 56 of the image chamber 54, a first image 50A comprising only S-Polarized light, and the displaying, with the second display 60 of the image chamber 54 in communication with the system controller 34, a second image 50B at block 208 further includes displaying, with the second display 60 of the image chamber 54, a second image 50B comprising only S-Polarized light.

In another exemplary embodiment the method 200 further includes, moving to block 218, reflecting, with the first reflector 58, S-Polarized light traveling from the linear polarizer 98 toward the first reflector 58, toward the first display 56, and, moving to block 220, reflecting, with the second reflector 62, S-Polarized light traveling from the linear polarizer 98 toward the second reflector 62, toward the second display 60.

In another exemplary embodiment the method 200 further includes, moving to block 222, deflecting, with a first cover glass 116 on the first display 56, a first portion of light reflected to the first display 56, by the first reflector 58, away from the first reflector 58, moving to block 224, reflecting, with the first cover glass 116 on the first display 56, a second portion of light reflected to the first display 56, by the first reflector 58, back toward the first reflector 58, moving to block 226, reflecting, with the first reflector 58, light reflected from the first cover glass 116 toward the linear polarizer 98, moving to block 228, deflecting, with a second cover glass 118 on the second display 60, a first portion of light reflected to the second display 60, by the second reflector 62, away from the second reflector 62, moving to block 230, reflecting, with the second cover glass 118 on the second display 60, a second portion of light reflected to the second display 60, by the second reflector 62, back toward the second reflector 62, and, moving to block 232, reflecting, with the second reflector 62, light reflected from the second cover glass 118 toward the polarizer 98.

In another exemplary embodiment, the method 200 further includes, prior to reflecting, with the first reflector 58, S-Polarized light traveling from the linear polarizer 98 toward the first reflector 58, toward the first display 56 at block 218, and, reflecting, with the second reflector 62, S-Polarized light traveling from the linear polarizer 98 toward the second reflector 62, toward the second display 60 at block 220, moving to block 234, converting, with a quarter wave plate 132 positioned between the linear polarizer 98 and the first reflector 58 and between the linear polarizer 98 and the second reflector 62, linear S-Polarized light traveling from the linear polarizer 98 toward the first reflector 58 to circularly polarized light, and, moving to block 236, converting, with the quarter wave plate 132, linear S-Polarized light traveling from the linear polarizer 98 toward the second reflector 62 to circularly polarized light.

Further, the method 200 includes, after reflecting, with the second cover glass 118 on the second display 60, a second portion of light reflected to the second display 60, by the second reflector 62, back toward the second reflector 62 at block 230, and reflecting, with the second reflector 62, light reflected from the second cover glass 118 toward the polarizer 98 at block 232, moving to block 238, converting, with the quarter wave plate 132, circularly polarized light reflected, by the first reflector 58, toward the linear polarizer 98, to linear polarization, and, moving to block 240, converting, with the quarter wave plate 132, circularly polarized light reflected, by the second reflector 62, toward the linear polarizer 98, to linear polarization.

In another exemplary embodiment, each of the first reflector 58 and the second reflector 62 is a polarizing beam splitter adapted to reflect only S-Polarized light, wherein the method 200 includes, moving from block 216 to block 242, reflecting, with the first reflector 58, S-Polarized light traveling from the linear polarizer 98 toward the first reflector 58, toward the first display 56, and, moving to block 244, reflecting, with the second reflector 62, S-Polarized light traveling from the linear polarizer 98 toward the second reflector 62, toward the second display 60.

In another exemplary embodiment the method 200 further includes, moving to block 246, deflecting, with a first cover glass 116 on the first display 56, a first portion of light reflected to the first display 56, by the first reflector 58, away from the first reflector 58, moving to block 248, reflecting, with the first cover glass 116 on the first display 56, a second portion of light reflected to the first display 56, by the first reflector 58, back toward the first reflector 58, moving to block 250, reflecting, with the first reflector 58, light reflected from the first cover glass 116 toward the linear polarizer 98, moving to block 252, deflecting, with a second cover glass 118 on the second display 60, a first portion of light reflected to the second display 60, by the second reflector 62, away from the second reflector 62, moving to block 254, reflecting, with the second cover glass 118 on the second display 60, a second portion of light reflected to the second display 60, by the second reflector 62, back toward the second reflector 62, and, moving to block 256, reflecting, with the second reflector 62, light reflected from the second cover glass 118 toward the polarizer 98.

In another exemplary embodiment, the method 200 further includes, prior to reflecting, with the first reflector 58, S-Polarized light traveling from the linear polarizer 98 toward the first reflector 58, toward the first display 56 at block 242, and reflecting, with the second reflector 62, S-Polarized light traveling from the linear polarizer 98 toward the second reflector 62, toward the second display 60 at block 244, moving to block 258, converting, with a quarter wave plate 132 positioned between the linear polarizer 98 and the first reflector 58 and between the linear polarizer 98 and the second reflector 62, linear S-Polarized light traveling from the linear polarizer 98 toward the first reflector 58 to circularly polarized light, and, moving to block 260, converting, with the quarter wave plate 132, linear S-Polarized light traveling from the linear polarizer 98 toward the second reflector 62 to circularly polarized light.

Further, the method 200 includes, after reflecting, with the second cover glass 118 on the second display 60, a second portion of light reflected to the second display 60, by the second reflector 62, back toward the second reflector 62 at block 254, and reflecting, with the second reflector 62, light reflected from the second cover glass 118 toward the polarizer 98 at block 256, moving to block 262, converting, with the quarter wave plate 132, circularly polarized light reflected, by the first reflector 58, toward the linear polarizer 98, to linear polarization, and, moving to block 264, converting, with the quarter wave plate 132, circularly polarized light reflected, by the second reflector 62, toward the linear polarizer 98, to linear polarization.

A system of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image. Further, a system in accordance with the present disclosure reduces the amount of ambient light that leaks into the image chamber and to the passenger's eyes which affects the contrast and overall quality of the displayed images, thus maintaining higher image contrast and quality and providing a better viewing experience for the passenger.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of using a system for generating a centrally located floating image display within a Pepper's ghost image chamber for a plurality of passengers positioned within a vehicle compartment of a vehicle, comprising:
filtering, with a linear polarizer positioned between a transparent display and reflectors of the Pepper's ghost image chamber within, light traveling from the transparent display toward the reflectors, to increase the contrast of the image displayed within the Pepper's ghost image chamber;
displaying, with a first display of the image chamber in communication with a system controller, a first image;
receiving, with a first reflector individually associated with a first passenger, the first image from the first display;
reflecting, with the first reflector, the first image to the first passenger, wherein the first passenger perceives the first image floating at a central location within the image chamber;
displaying, with a second display of the image chamber in communication with a system controller, a second image;
receiving, with a second reflector individually associated with a second passenger, the second image from the second display;

reflecting, with the second reflector, the second image to the second passenger, wherein the second passenger perceives the second image floating at the central location within the image chamber; and
displaying, with the transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber.

2. The method of claim 1, wherein the filtering, with a linear polarizer positioned between the transparent display and the first reflector and between the transparent display and the second reflector, light traveling from the transparent display toward the first reflector and the second reflector further includes, filtering with the linear polarizer light traveling from the transparent display toward the first reflector and the second reflector and allowing only S-Polarized light to pass through the linear polarizer toward the first reflector and the second reflector.

3. The method of claim 2, wherein:
the displaying, with the first display of the image chamber in communication with the system controller, a first image, further includes displaying, with the first display of the image chamber, a first image comprising only S-Polarized light; and
the displaying, with the second display of the image chamber in communication with the system controller, a second image, further includes displaying, with the second display of the image chamber, a second image comprising only S-Polarized light.

4. The method of claim 3, further includes:
reflecting, with the first reflector, S-Polarized light traveling from the linear polarizer toward the first reflector, toward the first display; and
reflecting, with the second reflector, S-Polarized light traveling from the linear polarizer toward the second reflector, toward the second display;
deflecting, with a first cover glass on the first display, a first portion of light reflected to the first display, by the first reflector, away from the first reflector;
reflecting, with the first cover glass on the first display, a second portion of light reflected to the first display, by the first reflector, back toward the first reflector;
reflecting, with the first reflector, light reflected from the first cover glass toward the linear polarizer;
deflecting, with a second cover glass on the second display, a first portion of light reflected to the second display, by the second reflector, away from the second reflector;
reflecting, with the second cover glass on the second display, a second portion of light reflected to the second display, by the second reflector, back toward the second reflector; and
reflecting, with the second reflector, light reflected from the second cover glass toward the polarizer.

5. The method of claim 4, further including:
converting, with a quarter wave plate positioned between the linear polarizer and the first reflector and between the linear polarizer and the second reflector, linear S-Polarized light traveling from the linear polarizer toward the first reflector to circularly polarized light;

converting, with the quarter wave plate, linear S-Polarized light traveling from the linear polarizer toward the second reflector to circularly polarized light;

converting, with the quarter wave plate, circularly polarized light reflected, by the first reflector, toward the linear polarizer, to linear polarization; and converting, with the quarter wave plate, circularly polarized light reflected, by the second reflector, toward the linear polarizer, to linear polarization.

6. The method of claim 3, wherein each of the first reflector and the second reflector is a polarizing beam splitter adapted to reflect only S-Polarized light.

7. The method of claim 6, further including:

deflecting, with a first cover glass on the first display, a first portion of S-Polarized light reflected to the first display, by the first reflector, away from the first reflector;

reflecting, with the first cover glass on the first display, a second portion of S-Polarized light reflected to the first display, by the first reflector, back toward the first reflector;

reflecting, with the first reflector, S-polarized light reflected from the first cover glass toward the polarizer;

deflecting, with a second cover glass on the second display, a first portion of S-Polarized light reflected to the second display, by the second reflector, away from the second reflector;

reflecting, with the second cover glass on the second display, a second portion of S-Polarized light reflected to the second display, by the second reflector, back toward the second reflector; and reflecting, with the second reflector, S-Polarized light reflected from the second cover glass toward the polarizer.

8. The method of claim 7, further including:

converting, with a quarter wave plate positioned between the linear polarizer and the first reflector and between the linear polarizer and the second reflector, linear S-Polarized light traveling from the linear polarizer toward the first reflector to circularly polarized light.

9. The method of claim 8, further including:

converting, with the quarter wave plate, linear S-Polarized light traveling from the linear polarizer toward the second reflector to circularly polarized light; and converting, with the quarter wave plate, circularly polarized light reflected, by the first reflector, toward the linear polarizer, to linear polarization.

10. The method of claim 9, further including converting, with the quarter wave plate, circularly polarized light reflected, by the second reflector, toward the linear polarizer, to linear polarization.

11. A system for generating a centrally located floating image display for a plurality of passengers positioned within a vehicle compartment within a vehicle, comprising:

a Pepper's ghost image chamber;

a linear polarizer positioned between a transparent touch screen display and reflectors of the Pepper's ghost image chamber, the linear polarizer adapted to filter light traveling from the transparent display toward the reflectors and increase contrast of the image displayed within the Pepper's ghost image chamber;

a system controller;

the image chamber including:

a first display adapted to project a first image;

a first reflector individually associated with the first display and a first one of the plurality of passengers, the first reflector adapted to receive the first image from the first display and to reflect the first image to the first passenger, wherein the first passenger perceives the first image floating at a central location within the image chamber;

a second display adapted to project a second image; and a second reflector individually associated with the second display and a second one of the plurality of passengers, the second reflector adapted to receive the second image from the second display and to reflect the second image to the second passenger, wherein, the second passenger perceives the second image floating at the central location within the image chamber; and the transparent touch screen display positioned between the first reflector and the first passenger and between the second reflector and the second passenger and adapted to display first private information to the first passenger within an image plane positioned in front of the first image floating at the central location within the image chamber and to receive input from the first passenger, and adapted to display second private information to the second passenger within an image plane positioned in front of the second image floating at the central location within the image chamber and to receive input from the second passenger.

12. The system of claim 11, wherein the linear polarizer is adapted to allow only S-Polarized light to pass through the linear polarizer toward the first reflector and the second reflector, and the first display is adapted to display a first image comprising only S-Polarized light, and the second display is adapted to display a second image comprising only S-Polarized light.

13. The system of claim 12, wherein the first reflector is adapted to reflect S-Polarized light traveling from the linear polarizer toward the first reflector, to the first display, and the second reflector is adapted to reflect S-Polarized light traveling from the linear polarizer toward the second reflector, to the second display.

14. The system of claim 13, further including:

a first cover glass positioned on the first display and adapted to deflect a first portion of light reflected to the first display by the first reflector, away from the first reflector and to reflect a second portion of light reflected to the first display, by the first reflector, back to the first reflector, the first reflector adapted to reflect light from the first cover glass toward the linear polarizer; and a second cover glass positioned on the second display and adapted to deflect a first portion of light reflected to the second display by the second reflector, away from the second reflector and to reflect a second portion of light reflected to the second display, by the second reflector, back to the second reflector, the second reflector adapted to reflect light from the second cover glass toward the linear polarizer.

15. The system of claim 14, further including a quarter wave plate positioned between the linear polarizer and the first reflector and between the linear polarizer and the second reflector, the quarter wave plate adapted to:

convert linear S-Polarized light traveling from the polarizer toward the first reflector to circularly polarized light;

convert linear S-Polarized light traveling from the polarizer toward the second reflector to circularly polarized light;

convert circularly polarized light reflected, by the first reflector, toward the polarizer, to linear polarization; and convert circularly polarized light reflected, by the second reflector, toward the polarizer, to linear polarization.

16. The system of claim 13, wherein each of the first reflector and the second reflector is a polarizing beam splitter adapted to reflect only S-Polarized light.

17. The system of claim 16, further including:

a first cover glass positioned on the first display and adapted to deflect a first portion of the S-Polarized light reflected to the first display by the first reflector, away from the first reflector and to reflect a second portion of the S-Polarized light reflected to the first display, by the first reflector, back to the first reflector, the first reflector adapted to reflect S-Polarized light from the first cover glass toward the linear polarizer; and a second cover glass positioned on the second display and adapted to deflect a first portion of the S-Polarized light reflected to the second display by the second reflector, away from the second reflector and to reflect a second portion of the S-Polarized light reflected to the second display, by the second reflector, back to the second reflector, the second reflector adapted to reflect S-Polarized light from the second cover glass toward the linear polarizer.

18. The system of claim 17, further including a quarter wave plate positioned between the linear polarizer and the first reflector and between the linear polarizer and the second reflector, the quarter wave plate adapted to:

convert linear S-Polarized light traveling from the polarizer toward the first reflector to circularly polarized light;

convert linear S-Polarized light traveling from the linear polarizer toward the second reflector to circularly polarized light;

convert circularly polarized light reflected, by the first reflector, toward the linear polarizer, to linear polarization; and convert circularly polarized light reflected, by the second reflector, toward the linear polarizer, to linear polarization.

19. A vehicle having a system for generating a centrally located floating three-dimensional image display for a plurality of passengers positioned within a vehicle compartment, comprising:

a system controller;

an image chamber including:

a first display adapted to project a first image comprising only S-Polarized light;

a first reflector, adapted to reflect only S-Polarized light, individually associated with the first display and a first one of the plurality of passengers, the first reflector adapted to receive the first image from the first display and reflect the first image to the first passenger, wherein the first passenger perceives the first image floating at a central location within the image chamber;

a second display adapted to project a second image comprising only S-Polarized light; and a second reflector, adapted to reflect only S-Polarized light, individually associated with the second display and a second one of the plurality of passengers, the second reflector adapted to receive the second image from the second display and to reflect the second image to the second passenger, wherein, the second passenger perceives the second image floating at the central location within the image chamber;

a transparent touch screen display positioned between the first reflector and the first passenger and between the second reflector and the second passenger and adapted to display first private information to the first passenger within an image plane positioned in front of the first image floating at the central location within the image chamber and to receive input from the first passenger, and adapted to display second private information to the second passenger within an image plane positioned in front of the second image floating at the central location within the image chamber and to receive input from the second passenger;

a linear polarizer positioned between the transparent touch screen display and the first reflector and between the transparent display and the second reflector and adapted to allow only S-Polarized light to pass from the transparent touch screen display, through the linear polarizer and toward the first reflector and the second reflector, wherein, the first reflector is further adapted to reflect S-Polarized light traveling from the linear polarizer toward the first reflector, to the first display, and the second reflector is further adapted to reflect S-Polarized light traveling from the linear polarizer toward the second reflector, to the second display;

a first cover glass positioned on the first display and adapted to deflect a first portion of light reflected to the first display by the first reflector, away from the first reflector and to reflect a second portion of light reflected to the first display, by the first reflector, back to the first reflector, the first reflector further adapted to reflect light from the first cover glass toward the linear polarizer; and a second cover glass positioned on the second display and adapted to deflect a first portion of light reflected to the second display by the second reflector, away from the second reflector and to reflect a second portion of light reflected to the second display, by the second reflector, back to the second reflector, the second reflector further adapted to reflect light from the second cover glass toward the linear polarizer.

20. The vehicle of claim 19, further including a quarter wave plate positioned between the linear polarizer and the first reflector and between the linear polarizer and the second reflector, the quarter wave plate adapted to:

convert linear S-Polarized light traveling from the linear polarizer toward the first reflector to circularly polarized light;

convert linear S-Polarized light traveling from the linear polarizer toward the second reflector to circularly polarized light;

convert circularly polarized light reflected, by the first reflector, toward the linear polarizer, to linear polarization; and convert circularly polarized light reflected, by the second reflector, toward the linear polarizer, to linear polarization.

* * * * *